US010959136B2

(12) United States Patent
Ogura (10) Patent No.: US 10,959,136 B2
(45) Date of Patent: *Mar. 23, 2021

(54) RADIO ACCESS NETWORK CONTROL METHOD AND RADIO ACCESS NETWORK

(71) Applicant: NEC CORPORATION, Tokyo (JP)

(72) Inventor: Daisuke Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 473 days.

This patent is subject to a terminal disclaimer.

(21) Appl. No.: 15/907,339

(22) Filed: Feb. 28, 2018

(65) Prior Publication Data

US 2018/0192336 A1    Jul. 5, 2018

Related U.S. Application Data

(63) Continuation of application No. 14/521,673, filed on Oct. 23, 2014, now Pat. No. 9,949,175, which is a (Continued)

(30) Foreign Application Priority Data

Dec. 12, 2002 (JP) .................................. 2002-360857

(51) Int. Cl.
*H04W 36/00* (2009.01)
*H04W 88/12* (2009.01)
(Continued)

(52) U.S. Cl.
CPC ....... *H04W 36/0061* (2013.01); *H04W 88/12* (2013.01); *H04W 92/12* (2013.01); *H04W 92/14* (2013.01)

(58) Field of Classification Search
CPC . H04W 36/0061; H04W 88/12; H04W 92/12; H04W 92/14
See application file for complete search history.

(56) References Cited

U.S. PATENT DOCUMENTS 6,374,112 B1   4/2002   Widegren et al.
6,539,237 B1   3/2003   Sayers et al.
(Continued)

FOREIGN PATENT DOCUMENTS

EP   1158823 A1   11/2001
EP   1198147 A2    4/2002
(Continued)

OTHER PUBLICATIONS

Kalliokulju, "User Plane Architecture of 3rd Generation Moble", Telecommunication Network, Networks, 1999. (ICON '99) IEEE International Conference on Sep. 28-Oct. 1, 1999, pp. 270-278.
(Continued)

*Primary Examiner* — Michael J Moore, Jr.
(74) *Attorney, Agent, or Firm* — Sughrue Mion, PLLC (57) ABSTRACT

In radio access network (RAN) 1 of the present invention, the configuration of radio network controller (RNC) 4 is physically separated into control plane controllers (CPE) 41a-41b for controlling signalling and user plane controllers (UPE) 42a-42c for controlling user data. User plane controllers 42a-42c report their own status information (traffic information/used channel bandwidth information/alarm information) to control plane controllers to which they belong, and control plane controllers 41a-41b manage the status information of the user plane controllers for each of user plane controllers subordinate thereto.

18 Claims, 9 Drawing Sheets

Related U.S. Application Data continuation of application No. 10/537,699, filed as application No. PCT/JP03/15149 on Nov. 27, 2003, now Pat. No. 8,903,453.

(51) Int. Cl.
*H04W 92/12* (2009.01)
*H04W 92/14* (2009.01)

(56) References Cited

U.S. PATENT DOCUMENTS

| | | | |
|---|---|---|---|
| 7,164,917 | B2 | 1/2007 | Sakata et al. |
| 7,336,631 | B2 | 2/2008 | Okubo |
| 7,408,948 | B2 | 8/2008 | Lopponen et al. |
| 7,457,260 | B2 | 11/2008 | Torsner et al. |
| 7,471,957 | B2 | 12/2008 | Palkisto et al. |
| 7,548,530 | B2 | 6/2009 | Diaz Cervera et al. |
| 7,626,971 | B2 | 12/2009 | Noma |
| 8,023,435 | B2 | 9/2011 | Tang et al. |
| 8,144,728 | B2 | 3/2012 | Ahmavaara |
| 8,903,453 | B2 * | 12/2014 | Ogura ............... H04W 88/12 455/560 |
| 9,949,175 | B2 * | 4/2018 | Ogura ............... H04W 36/0061 |
| 2002/0089949 | A1 | 7/2002 | Bjelland et al. |
| 2002/0150092 | A1 | 10/2002 | Bontempi et al. |
| 2002/0151304 | A1 | 10/2002 | Hogan |
| 2003/0211855 | A1 | 11/2003 | Sarkkinen et al. |
| 2004/0024902 | A1 | 2/2004 | Mikkola |
| 2004/0203714 | A1 | 10/2004 | Van Lieshout et al. |
| 2005/0210154 | A1 | 9/2005 | Verma et al. |
| 2006/0033746 | A1 | 2/2006 | Ogura |
| 2006/0116136 | A1 | 6/2006 | Noma |

FOREIGN PATENT DOCUMENTS

| | | |
|---|---|---|
| JP | 11-266257 A | 9/1999 |
| JP | 2001-251658 A | 9/2001 |
| JP | 2002-218533 A | 8/2002 |
| JP | 2003-348661 A | 12/2003 |
| JP | 2004-32333 A | 1/2004 |
| JP | 2004-48209 A | 2/2004 |
| JP | 2004-194015 A | 7/2004 |
| JP | 2004-194073 A | 7/2004 |
| JP | 2004-194086 A | 7/2004 |
| JP | 2004-194087 A | 7/2004 |
| JP | 2005-252502 A | 9/2005 |
| WO | 02/05538 A2 | 1/2002 |
| WO | 02/05573 A2 | 1/2002 |
| WO | 02/065796 A1 | 8/2002 |

OTHER PUBLICATIONS

Jiro Kawamata, Shiro Saito, Shin'ichiro Motoyoshi, and Tsutomu Okurano: "All-IP Mobile Network Solution," NEC Technical Journal, Nov. 2002 edition, vol. 55, No. 11, pp. 23-27, NEC Corporation, Nov. 25, 2002.

3GPP Technical Specification (3GPP TS 25.401 V4.5.0 (Sep. 2002) Technical Specification 3rd Generation Partnership Project; Technical Specification Group Radio Access Network; UTRAN Overall Description (Release 4) Sep. 2002.

* cited by examiner

PRIOR ART

| A | Local Traffic Information |
|---|---|
| B | Outbound Channel Bandwidth Information |
| C | Local Alarm Information |

RADIO ACCESS NETWORK CONTROL METHOD AND RADIO ACCESS NETWORK

CROSS-REFERENCE TO RELATED APPLICATIONS

This application is a Continuation Application of U.S. application Ser. No. 14/521,673, filed Oct. 23, 2014, which is a Continuation Application of U.S. application Ser. No. 10/537,699, filed Jun. 6, 2005, now U.S. Pat. No. 8,903,453, which is a National Stage entry of PCT Application PCT/JP2003/015149, filed Nov. 27, 2003, which claims priority based on Japanese Patent Application No. 2002-360857, filed Dec. 12, 2002, the disclosures of which are incorporated herein by reference in their entirety.

TECHNICAL FIELD

The present invention relates to a radio access network (RAN) control method and a radio access network, and more particularly, to improvements in a radio network controller (RNC) in a W-CDMA (Wideband-Code Division Multiple Access) cellular scheme.

BACKGROUND ART

Figure 1:
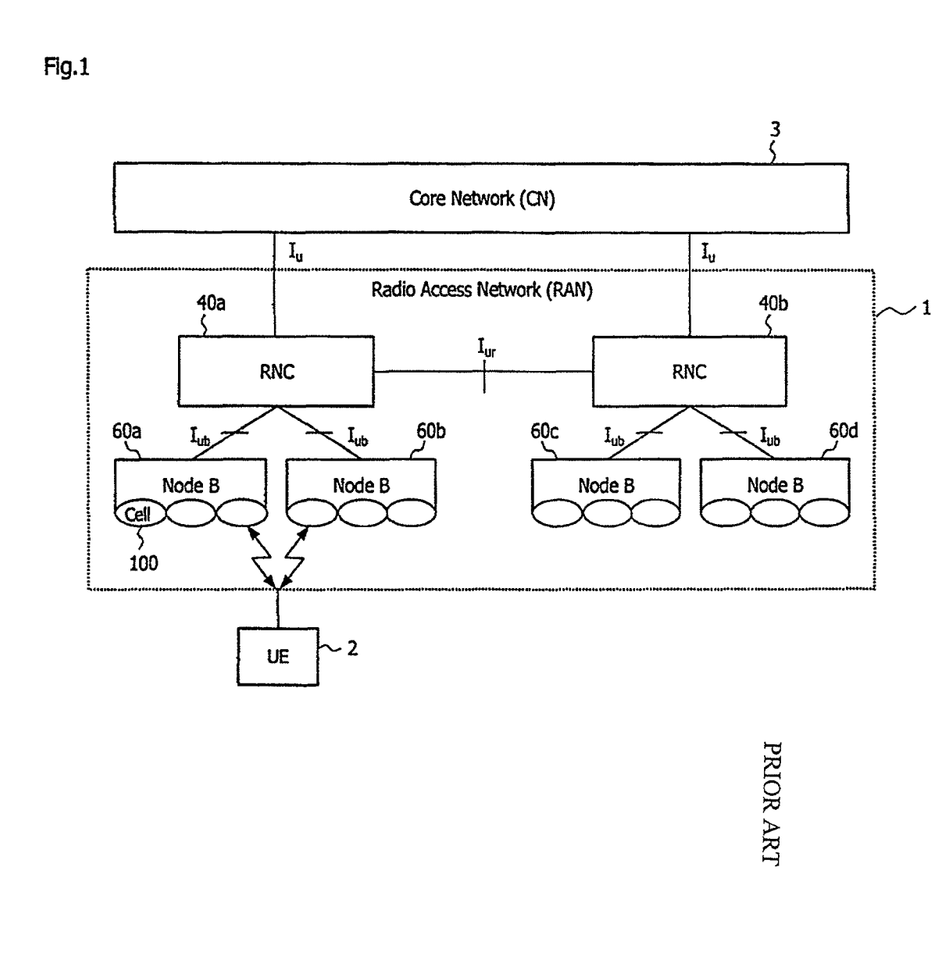
FIG. 1 is a diagram illustrating the configuration of a mobile communication system which includes an example of a conventional radio access network.

FIG. 1 illustrates the configuration of a W-CDMA communication system as an example of a configuration of a mobile communication system which includes a conventional radio access network.

As illustrated in FIG. 1, radio access network (RAN) 10 of this conventional example is composed of radio network controllers (RNC) 40a, 40b, and Node B's 60a-60d. This RAN 10 is connected to core network (CN) 3, which is an exchange network, through a Iu interface. As an interface between Node B's 60a-60d and RNC's 40a, 40b, a Iub interface is defined, while a Iur interface is defined as an interface between RNC's 40a, 40b. Details on the configuration of FIG. 1 are described in the following document:

Document: 3GPP TS 25.401 V5.4.0 (2002-09) (3rd Generation Partnership Project: Technical Specification Group Radio Access Network: UTRAN Overall Description [Release 5])

Node B's 60a-60d are logical nodes for performing radio transmission and reception, and specifically, they are radio base stations. Each of Node B's 60a-60d covers one or a plurality of cells 100, and is connected to user equipment (UE) 2 through a radio interface to terminate a radio channel.

RNC's 40a, 40b manage Node B's 60a-60d, and also select and combine radio paths in the event of a soft handover. RNC's 40a, 40b each comprise a physical integration of a function of controlling a C-plane (Control Plane) which is a protocol for transferring control signals for signaling control to set and release a call, and a function of controlling a U-plane (User Plane) which is a protocol for transferring user data related to user equipment (UE) 2.

In a conventional radio access network in which the U-plane control function and C-plane control function are integrated, when one wishes to improve the signaling throughput, the entire RNC must be added though the C-plane control function alone should be added. When one wishes to improve a user data transfer rate, the entire RNC must be added although it should only be necessary to add just the U-plane control function. In this way, the configuration of the conventional RNC encounters difficulties in building a highly scalable system.

Therefore, there has recently been proposed in some fields, as a configuration of a radio access network, a configuration which physically separates a C-plane controller for controlling the C-plane, and a U-plane controller for controlling the U-plane as separate devices.

According to this configuration, a C-plane controller alone should be added when one wishes to improve the signaling throughput, while a U-plane controller alone should be added when one wishes to improve a user data transfer rate, thus making it possible to build a highly scalable system.

As specific configurations, a variety of configurations can be contemplated, including a configuration in which n U-plane controllers are arranged to belong to a single C-plane controller, a configuration in which m U-plane controllers are arranged to belong to n C-plane controllers, and so on. Further, in the configuration in which m U-plane controllers are arranged to belong to n C-plane controllers, one U-plane controller can be arranged subordinate to two or more C-plane controllers.

However, in a conventional radio access network in which a C-plane controller is physically separated from a U-plane controller, a problem arises in that extreme difficulties are experienced in the management of the status of the U-plane controller (particularly, the management of status information on continuously varying traffic and the like) which can be readily confirmed in an existing system configuration in which both U-plane and C-plane control functions are integrated with each other.

Particularly, in a configuration in which m U-plane controllers are arranged to belong to n C-plane controllers, and a single U-plane controller is arranged subordinate to two or more C-plane controllers, a C-plane controller is not aware how its subordinate U-plane controllers are used by other C-plane controllers, thus making it more difficult to manage the status of the U-plane controllers subordinate thereto.

In this way, in the radio access network in which the C-plane controller is physically separated from the U-plane controller, it is difficult to manage the status of the U-plane controller. For this reason, when the traffic varies from one minute to the next particularly in a handover operation which involves addition of a radio link and the like, resources of the U-plane controller cannot be allocated in an efficient manner. Therefore, a need exists for a certain control method which can accomplish the management of the status of the U-plane controller and the handover operation, which has been done in existing systems.

It is an object of the present invention to provide a radio access network control method, and a radio access network which are capable of accomplishing the management of the status of the U-plane controller and a handover operation in the radio access network, in which a C-plane controller is physically separated from the U-plane controller.

DISCLOSURE OF THE INVENTION

The present invention includes a method of controlling a radio access network, disposed between user equipment and an exchange network, in which user plane control means for controlling transfers of user data related to the user equipment are physically separated from control plane control means for controlling transfers of control signals for signaling control. In this control method, the user plane control means reports its status information to control plane control means to which it belongs, while the control plane control means collectively manages the status information reported from the user plane control means subordinate thereto for each user plane control means. The status information on the user plane control means can include traffic information and alarm information within the user plane control means, information on a bandwidth of a channel directed from the user plane control means to the outside.

Consequently, the control plane control means can readily manage the status information of the user plane control means subordinate thereto.

The control plane control means can also determine a user plane control means to which a radio link is added at the destination of user equipment based on the status information on subordinate user plane control means in the event of a handover, and accomplish a route control such as issuing a radio link addition instruction to the determined user plane control means.

Specifically, the control plane control means implements a route control in the following manner when user equipment that is located in an area of a first radio base station having a radio link established between itself and a first user plane control means subordinate to the control plane control means moves to the area of a second radio base station. For example, when the second radio base station belongs to the first user plane control means or to another second user plane control means subordinate to the control plane control means, the control plane control means determines based on status information of the first or second user plane control means whether or not a radio link can be added to the first or second user plane control means. When a radio link can be added, the control plane control means instructs the first or second user plane control means to add a radio link between itself and the second radio base station.

Also, in the event of a handover, the control plane control means may refer to another control plane control means for status information of user plane control means subordinate to this other control plane control means to collect the status information, determine user plane control means to which a radio link is added at the destination of the user equipment based on the collected status information, and instruct the determined user plane control means to add a radio link.

Specifically, when the user equipment located in the area of the first radio base station having a radio link between itself and the first user plane control means subordinate to the control plane control means moves to the area of the second radio base station, the control plane control means implements a route control in the following manner. For example, when the second radio base station belongs to second user plane control means subordinate to another control plane control means, the control plane control means refers to this other control plane control means for status information of the second user plane control means to collect the status information, and determines based on the collected status information whether or not a radio link can be added to the second user plane control means. When a radio link can be added, the control plane control means instructs the second user plane control means to add a radio link between itself and the second radio base station.

BEST MODE FOR CARRYING OUT THE INVENTION

In the following, a preferred embodiment of the present invention will be described in detail with reference to the drawings.

Figure 2:
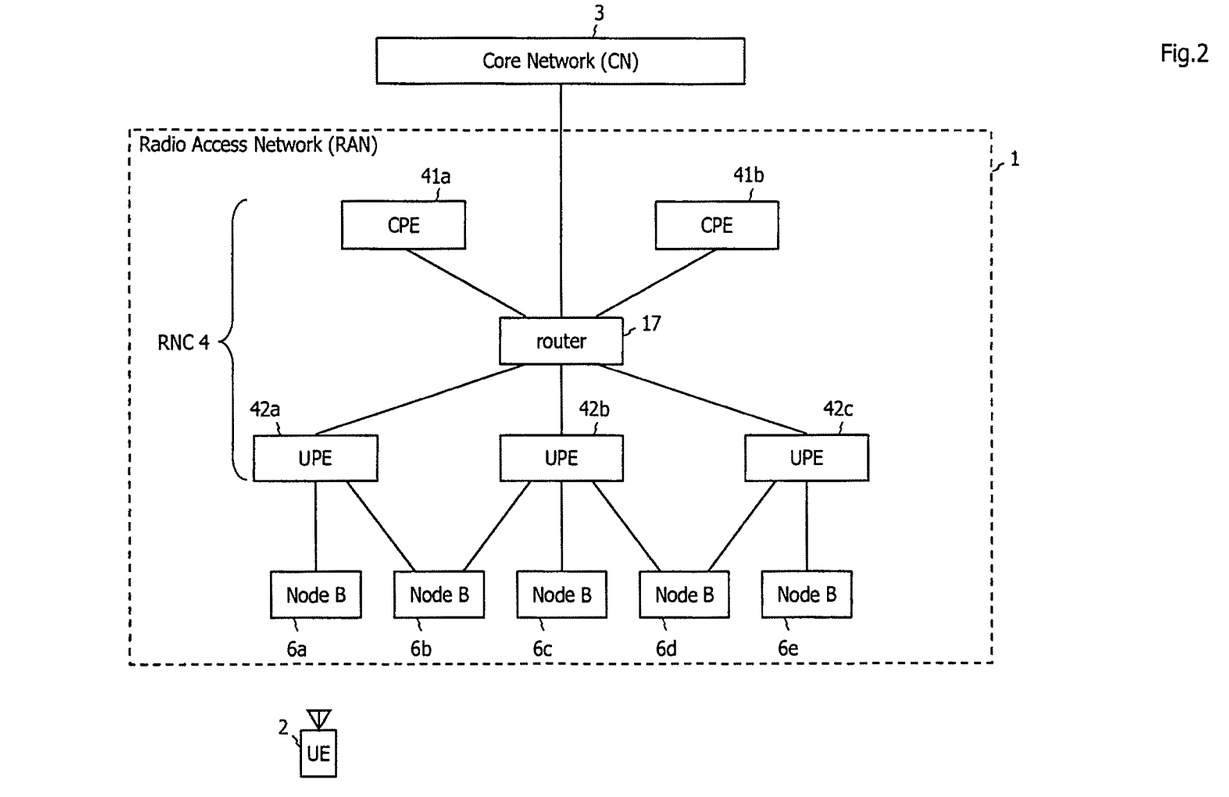
FIG. 2 is a diagram illustrating the configuration of a mobile communication system which includes a radio access network according to one embodiment of the present invention.

FIG. 2 illustrates the configuration of a mobile communication system which includes a radio access network according to one embodiment of the present invention.

As illustrated in FIG. 2, radio access network (RAN) 1 according to this embodiment is composed of radio network controller (RNC) 4 and Node B's 6a-6e. RNC 4 is physically separated into C-plane controllers (CPE: control plane equipment) 41a-41b for controlling signaling, and U-plane controllers (UPE: user plane equipment) 42a-42c for controlling user data. C-plane controllers 41a-41b and U-plane controllers 42a-42c are connected through router 17. While FIG. 2 shows two C-plane controllers 41a-41b and three U-plane controllers 42a-42c, it goes without saying that the number of the C-plane controllers and U-plane controllers are not limited to these. Each of the C-plane controllers and U-plane controllers may include a memory storing software therein and a processor which implements the software and thereby controls the C-plane and U-plane, respectively.

Node B's 6a-6e are nodes which are similar in configuration to Node B's 60a-60d in FIG. 1 and perform similar operations, and specifically they are radio base station devices.

C-plane controllers 41a-41b perform signaling operations such as a call operation, and may not have enough throughputs as the amount of calls increases. In this event, the signaling throughput can be improved only by additionally installing a C-plane controller rather than additionally installing in units of RNC 4 as before.

On the other hand, U-plane controllers 42a-42c perform transfer operations of user data transferred from user equipment (UE) 2 through Node B's (radio base stations) 6a-6e, and may not have enough throughputs if user equipment (UE) 2 transfers an increased amount of transmission/reception data. In this event, the user data transfer rate can be improved only by additionally installing the U-plane controller rather than additionally installing in units of RNC 4 as before.

C-plane controllers 41a-41b manage resources of Node B's subordinate thereto. When C-plane controller 41a-41b wishes to use resources of Node B subordinate to another C-plane controller, C-plane controller 41a-41b refers to this other C-plane controller, which manages the resources of the Node B, for status information on the Node B.

C-plane controllers 41a-41b further manage resources of the U-plane controllers subordinate thereto. When C-plane controllers 41a-41b wishes to use resources of a U-plane controller subordinate to another C-plane controller, C-plane controllers 41a-41b refers to this other C-plane controller, which manages the resources of the U-plane controller, for status information on the U-plane controller.

Particularly, C-plane controllers 41a-41b manage status information which varies from one minute to another such as the status information on the U-plane controllers by collecting status information tables from the U-plane controllers subordinate thereto at all times.

Figure 3:
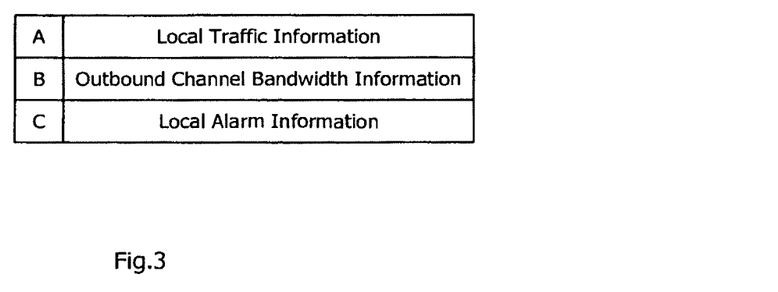
FIG. 3 is a diagram showing an exemplary status information table of a U-plane controller which is managed by a C-plane controller shown in FIG. 2.

Specifically, C-plane controllers 41a-41b collect the status information table, which includes three types of status information, i.e., A: local traffic information, B: outbound channel bandwidth information, and C: local alarm information, as shown in FIG. 3, from the U-plane controllers subordinate thereto. Each type of status information A-C comprises the following parameters:

A: Local Traffic Information

Parameters indicative of traffic information (the number of radio links and a resource use rate such as a U-plane use rate) within the U-plane controller.

B: Outbound Channel Bandwidth Information

Parameters indicative of information on a used bandwidth (presence or absence of the occurrence of a burst phenomenon, an average amount of data in a fixed time, and the like) on each of the channels directed to the outside of the U-plane controller, i.e., toward Node B and router (or C-plane controller) to which the U-plane controller is physically connected.

C: Local Alarm Information

Parameters indicative of alarm information (subnormal/abnormal states such as congestion, fault and the like) detected within the U-plane controller.

Also, in FIG. 2, in regard to the ascribed relationships among the C-plane controller, U-plane controller, and Node B, there are two relationships assumed herein: a relationship in which n lower nodes are arranged to belong to a single upper node, i.e., a relationship in which a dominating upper node is uniquely determined, and a relationship in which m lower nodes are arranged to belong to n upper nodes, i.e., a relationship in which dominating upper nodes are determined in double or multiple combinations.

Specifically, in FIG. 2, there is the following possession relationship among the C-plane controllers, U-plane controllers, and Node B's (radio base stations):

U-plane controllers 42a-42c

U-plane controller 42a: Subordinate only to C-plane controller 41a;

U-plane controller 42b: Subordinate to both C-plane controllers 41a, 41b (however, U-plane controller 42b is logically subordinate to C-plane controller 41a which manages the status of Node B's subordinate to U-plane controller 42b); and U-plane controller 42c: Subordinate only to C-plane controller 41b.

Node B's 6a-6e

Node B 6a: Subordinate only to U-plane controller 42a;

Node B 6b: Subordinate to both U-plane controllers 42a, 42b;

Node B 6c: Subordinate only to U-plane controller 42b;

Node B 6d: Subordinate to both U-plane controllers 42b, 42c; and

Node B 6e: Subordinate only to U-plane controller 42c.

It is contemplated by the present invention that the U-plane controllers are not separated from Node B's but they are integrated to establish a possession relationship between the C-plane controllers and Node B's (including the U-plane controllers) such that n Node B's (including the U-plane controllers) are arranged to belong to a single C-plane controller. It is also contemplated to establish a possession relationship such that m Node B's (including the U-plane controllers) are arranged to belong to n C-plane controllers.

Also, it is contemplated by the present invention to build an IP (Internet Protocol) based network configuration or an ATM (Asynchronous Transfer Mode) based network configuration between C-plane controllers 41a-41b and U-plane controllers 42a-42c. In FIG. 2, connections are made through router 17 between C-plane controllers 41a-41b and U-plane controllers 42a-42c because an IP-based network configuration is assumed between C-plane controllers 41a-41b and U-plane controllers 42a-42c.

In the following, a description will be given of a method of controlling radio access network (RAN) 1 illustrated in FIG. 2.

Figure 4:
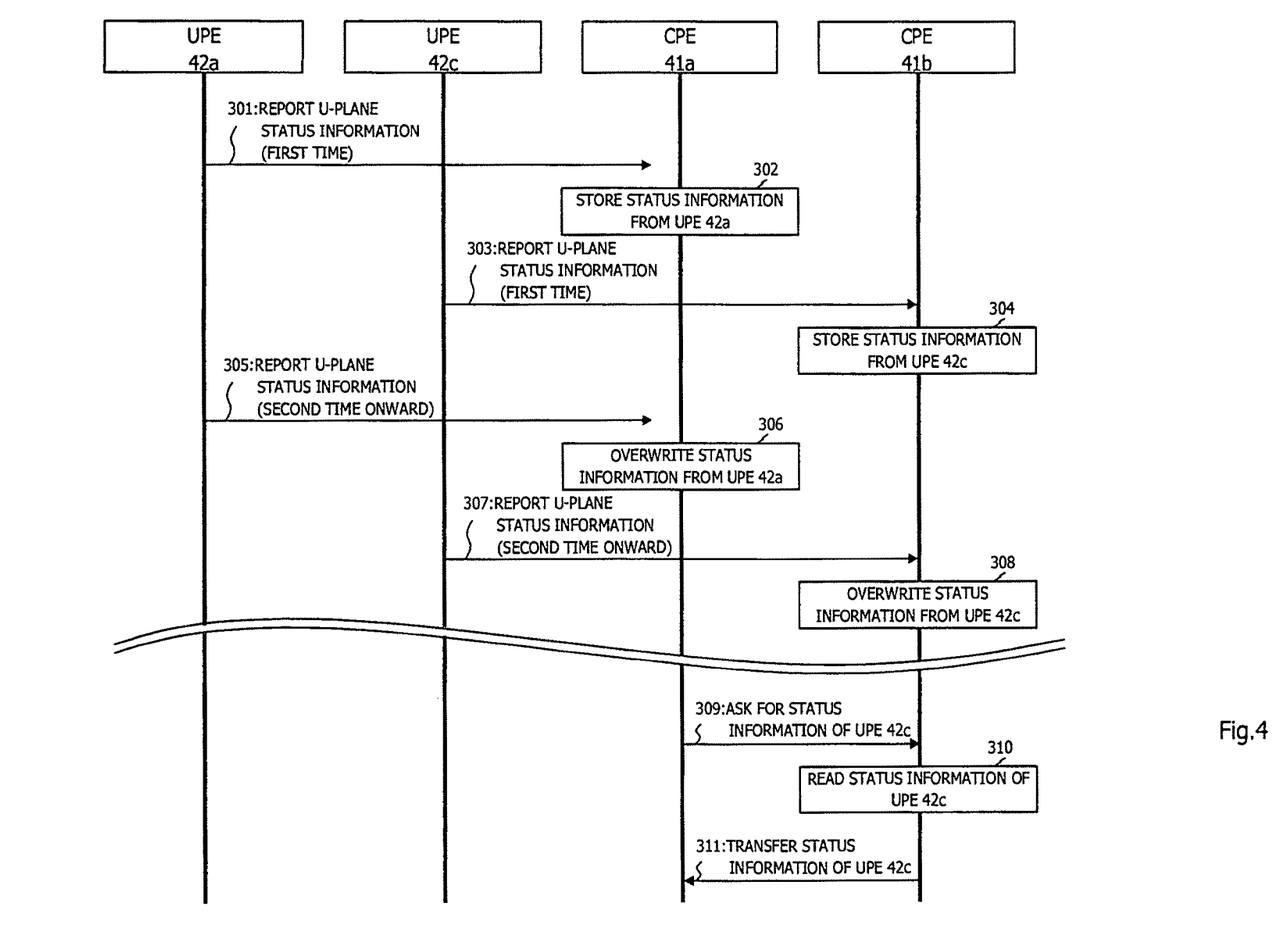
FIG. 4 is a flow chart for describing a process for collecting status information tables of U-plane controllers in the radio access network illustrated in FIG. 2.

First, a process performed by C-plane controllers 41a, 41b to collect status information on the U-plane controllers subordinate thereto will be described with reference to FIG. 4.

U-plane controller 42a sets a status information table including three types of status information (A: local traffic information, B: outbound channel bandwidth information, and C: local alarm information) as shown in FIG. 3 as a message which is transmitted to C-plane controller 41a to which it belongs (step 301).

A method by which U-plane controller 42a-42c reports the status information table may be a method in which the status information table is immediately reported in response to each receipt of a status information table transmission request from the C-plane controller to which it belongs, a method for reporting the status information table at a certain period, a method for reporting the status information table, as triggered by a change in status within the U-plane controller (for example, triggered by a detected fault or the like within the U-plane controller), and the like.

C-plane controller 41a stores the status information table received as a message from U-plane controller 42a in its local memory for each U-plane controller (step 302).

Similarly, U-plane controller 42c sets a status information table as shown in FIG. 3 as a message which is transmitted to C-plane controller 41b to which it belongs (step 303). C-plane controller 41b stores the status information table received as a message from U-plane controller 42c in its local memory for each U-plane controller (step 304).

Upon receipt of the status information table from U-plane controller 42a from the second time onward (step 305), C-plane controller 41a overwrites the status information table within the local memory with the contents of the received status information (step 306).

Similarly, upon receipt of the status information table from U-plane controller 42c from the second time onward (step 307), C-plane controller 41b overwrites the status information table within the local memory with the contents of the received status information (step 308).

Both C-plane controllers 41a, 41b include U-plane controller 42b subordinate to them. However, logically, U-plane controller 42b is subordinate to C-plane controller 41a which manages the status information of the Node B's which are subordinate to U-plane controller 42b. For this reason, U-plane controller 42b reports the status information table only to C-plane controller 41a to which it logically belongs, and C-plane controller 41a overwrites the status information table within the local memory with the contents of the status information reported from U-plane controller 42b.

In this way, C-plane controllers 41a, 41b collect the status information tables from the U-plane controllers subordinate thereto for management. Thus, C-plane controllers 41a, 41b can perform the following operations depending on the contents of the status information table.

Suppose, for example, that C-plane controllers 41a, 41b determine that a local traffic parameter of the U-plane controller exceeds a threshold for the local traffic parameter held in their local memories, then in this case, C-plane controllers 41a, 41b perform an access limiting operation such as an operation for limiting acceptance of new calls, an operation for expelling existing calls (including a handover operation), and the like to an appropriate U-plane controller.

Suppose also that C-plane controllers 41a, 41b determine, based on a variety of bandwidth parameters held in their local memories, that there is not sufficient free space in the remaining bandwidth of a channel between respective nodes associated with a U-plane controller to ensure a bandwidth required for a service requested by a new call, then in this case, C-plane controllers 41a, 41b perform an operation for limiting acceptance of new calls, an operation for accepting a service requested by a new call by changing the quality class of the service, and the like.

Suppose also that C-plane controllers 41a, 41b determine, based on a variety of alarm parameters held in their local memories, that a U-plane controller is in a subnormal/abnormal associated alarm condition such as congestion/failure, then in this case, C-plane controllers 41a, 41b perform an operation for limiting acceptance of new calls, releasing existing calls, and the like.

Further, C-plane controllers 41a, 41b can also refer, as required, to another C-plane controller to which an intended U-plane controller is subordinate for the status information table of the intended U-plane controller in order to acquire the status information table of U-plane controller other than the U-plane controllers subordinate thereto.

For example, when C-plane controller 41a acquires the status information table of U-plane controller 42c which is not subordinate thereto, C-plane controller 41a refers to C-plane controller 41b to which U-plane controller 42c is subordinate for the status information table of U-plane controller 42c (step 309).

In response, C-plane controller 41b reads the status information table of U-plane controller 42c from its local memory (step 310), and transfers the read status information table to C-plane controller 41a (step 311).

Processing at steps 309-311 is executed, for example, when C-plane controller 41a transfers an operation currently performed by the U-plane controller subordinate thereto to a U-plane controller other than the U-plane controller subordinate thereto for purposes of handover, relocation, and load distribution/risk distribution.

Figure 5:
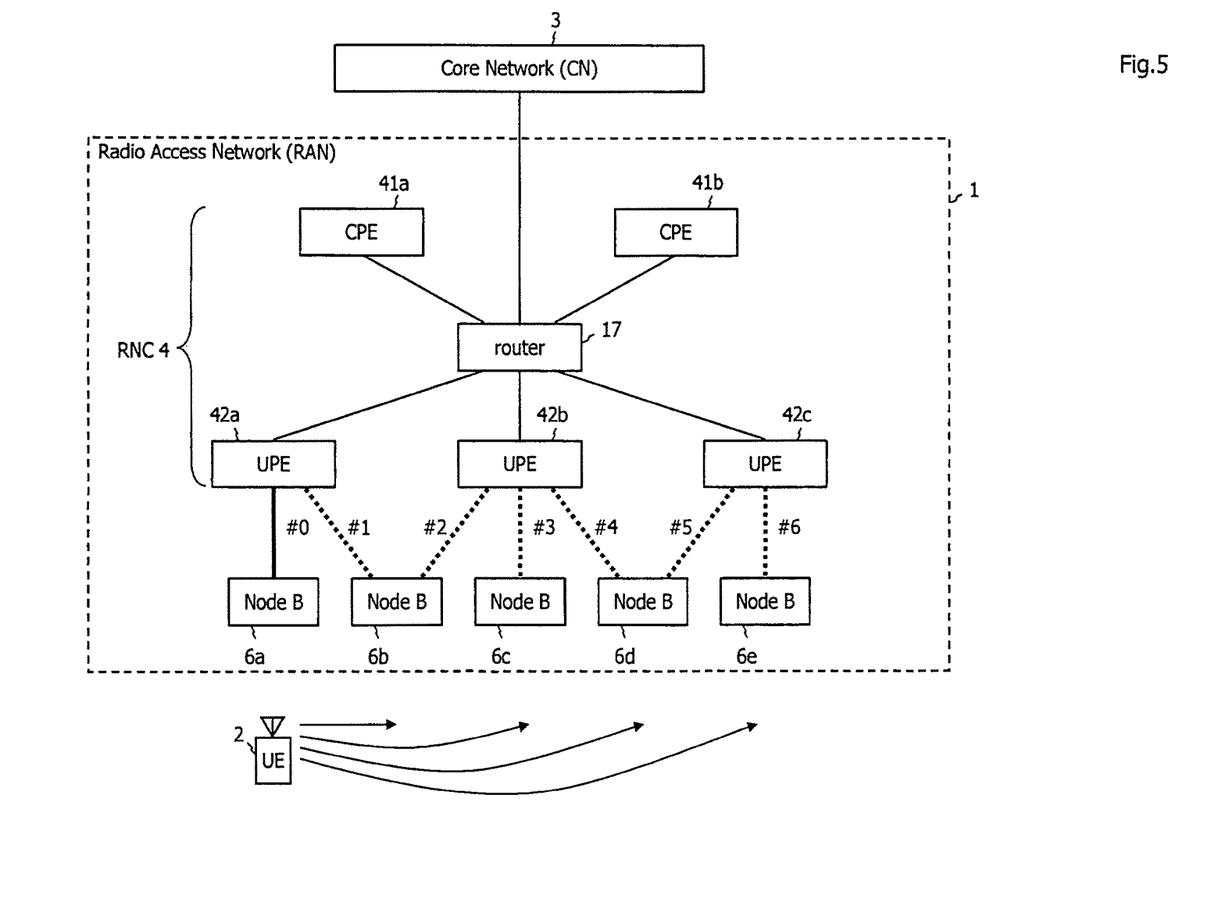
FIG. 5 is a diagram for describing a situation in which a handover operation is required in the radio access network illustrated in FIG. 2.

Next, referring to FIGS. 6 to 9, a description will be given of each handover operation when user equipment (UE) 2 located in a cell area covered by Node B 6a moves to another cell area covered by Node B 6b-6e, as illustrated in FIG. 5. Assume in FIG. 5 that a radio link established before user equipment (UE) 2 moves is route #0 which passes through U-plane controller 42a.

Figure 6:
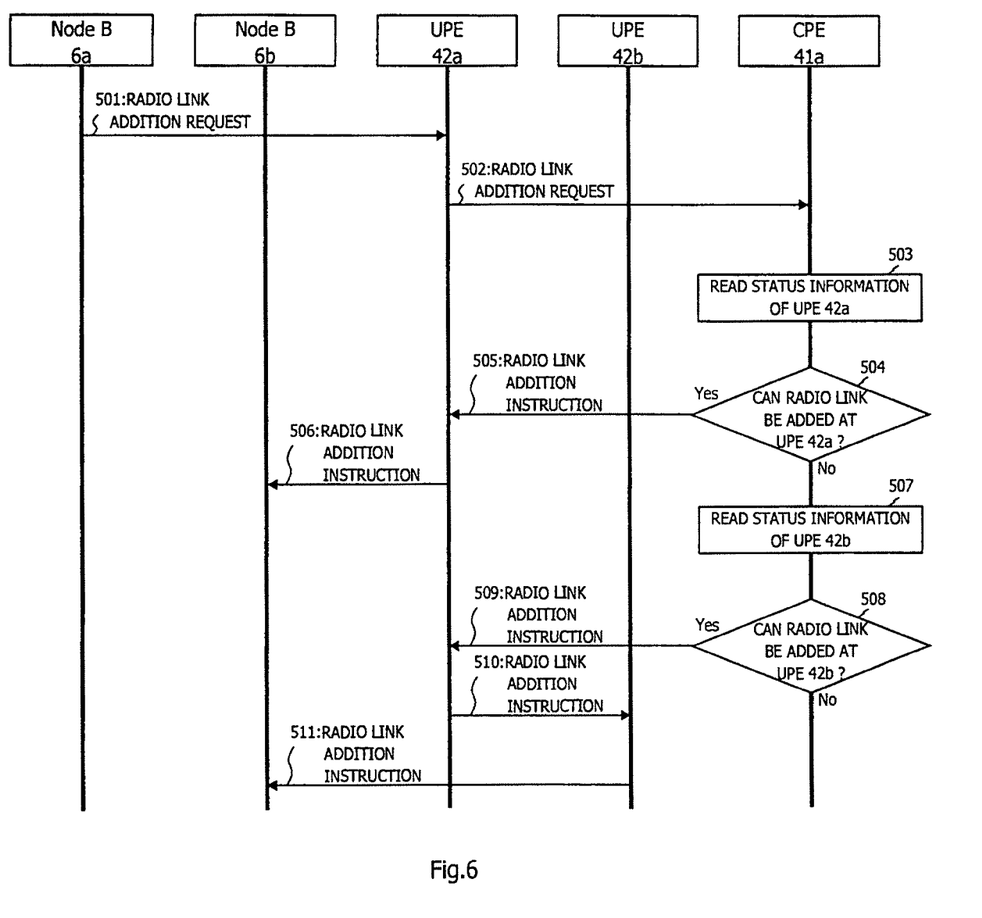
FIG. 6 is a flow chart for describing an example of a handover operation which is performed according to the situation in FIG. 5 in the radio access network illustrated in FIG. 2.

First described is a handover operation when user equipment (UE) 2 moves from the cell area of Node B 6a to the cell area of Node B 6b with reference to the flow chart of FIG. 6. Node B 6b is subordinate to C-plane controller 41a, similar to Node B 6a, and belongs to both U-plane controller 42a, 42b subordinate to C-plane controller 41a.

In this event, candidate radio links (RADIO LINK) for addition to Node B 6b include two routes: route #1 which passes through U-plane controller 42a, and route #2 which passes through U-plane controller 42b.

Thus, upon receipt of a request for adding a radio link to Node B 6b from Node B 6a through U-plane controller 42a (steps 501, 502), C-plane controller 41a first reads the status information table of its subordinate U-plane controller 42a, to which Node B 6b belongs, from its local memory (step 503). Then, C-plane controller 41a determines based on the status information table of U-plane controller 42a whether or not a radio link can be added at U-plane controller 42a (step 504).

When C-plane controller 41a determines at step 504 that a radio link can be added at U-plane controller 42a, C-plane controller 41a instructs U-plane controller 42a to add a radio link between U-plane controller 42a and Node B 6b (step 505). Subsequently, U-plane controller 42a instructs Node B 6b to adds a radio link between U-plane controller 42a and Node B 6b (step 506).

On the other hand, when C-plane controller 41a determines at step 504 that no radio link can be added at U-plane controller 42a, C-plane controller 41a reads the status information table of its subordinate U-plane controller 42b, to which Node B 6b also belongs, from its local memory (step 507). Then, C-plane controller 41a determines based on the status information table of U-plane controller 42b whether or not a radio link can be added at U-plane controller 42b (step 508).

When C-plane controller 41a determines at step 508 that a radio link can be added at U-plane controller 42b, C-plane controller 41a instructs U-plane controller 42b through U-plane controller 42a to add a radio link between U-plane controller 42b and Node B 6b (steps 509, 510). Subsequently, U-plane controller 42b instructs Node B 6b to add a radio link between U-plane controller 42b and Node B 6b (step 511).

At step 510, for directly transmitting/receiving signals between U-plane controller 42a and 42b, U-plane controllers 42a, 42b implement a protocol corresponding to an RNSAP (Radio Network Subsystem Application Part) protocol used in the transmission/reception of signals between RNC's in existing UTRAN (Universal Terrestrial RAN) to transmit/receive signals.

Even when C-plane controller 41a determines that no radio link can be added at either U-plane controller 42a or 42b as a result of reading the status information tables of U-plane controllers 42a, 42b, C-plane controller 41a still instructs U-plane controller 42a to add a radio link between U-plane controller 42a and Node B 6b to leave the determination as to whether the radio link is added to U-plane controller 42a. This is because a transition can have occurred to a state in which a radio link can be added, at the time that U-plane controller 42a receives a radio link addition instruction. However, C-plane controller 41a indicates a failure of the radio link addition instruction when an alarm is generated in U-plane controller 42a.

Figure 7:
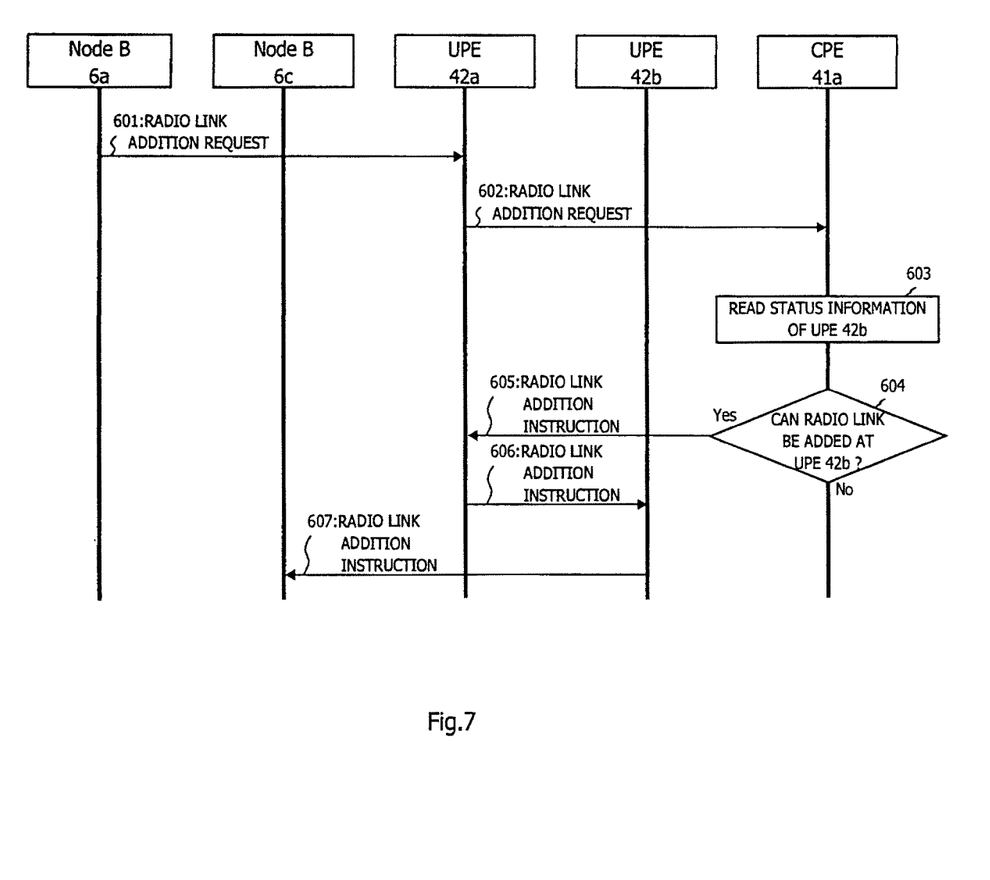
FIG. 7 is a flow chart for describing another example of the handover operation which is performed according to the situation in FIG. 5 in the radio access network illustrated in FIG. 2.

Next described is a handover operation when user equipment (UE) 2 moves from the cell area of Node B 6a to the cell area of Node B 6c with reference to FIG. 7. Node B 6c is subordinate to C-plane controller 41a, similar to Node B 6a, and belongs only to U-plane controller 42b subordinate to C-plane controller 41a.

In this event, as a candidate link (RADIO LINK) for addition to Node B 6c, there exists only one route which is route #3 that passes through U-plane controller 42b.

Thus, upon receipt of a request for adding a radio link to Node B 6c from Node B 6a through U-plane controller 42a (steps 601, 602), C-plane controller 41a reads the status information table of its subordinate U-plane controller 42b to which Node B 6c belongs, from its local memory (step 603). Then, C-plane controller 41a determines based on the status information table of U-plane controller 42b whether or not a radio link can be added at U-plane controller 42b (step 604).

When C-plane controller 41a determines at step 604 that a radio link can be added at U-plane controller 42b, C-plane controller 41a instructs U-plane controller 42b through U-plane controller 42a to add a radio link between U-plane controller 42b and Node B 6c (steps 605, 606). Subsequently, U-plane controller 42b instructs Node B 6c to add a radio link between Node B 6c and U-plane controller 42b (step 607).

Even when C-plane controller 41a determines that no radio link can be added at U-plane controller 42b as a result of reading the status information table of U-plane controller 42b, C-plane controller 41a still instructs U-plane controller 42b through U-plane controller 42a to add a radio link between U-plane controller 42b and Node B 6c to leave the determination as to whether the radio link is added to U-plane controller 42b. However, C-plane controller 41a indicates a failure of the radio link addition instruction when an alarm is generated in U-plane controller 42b.

Figure 8:
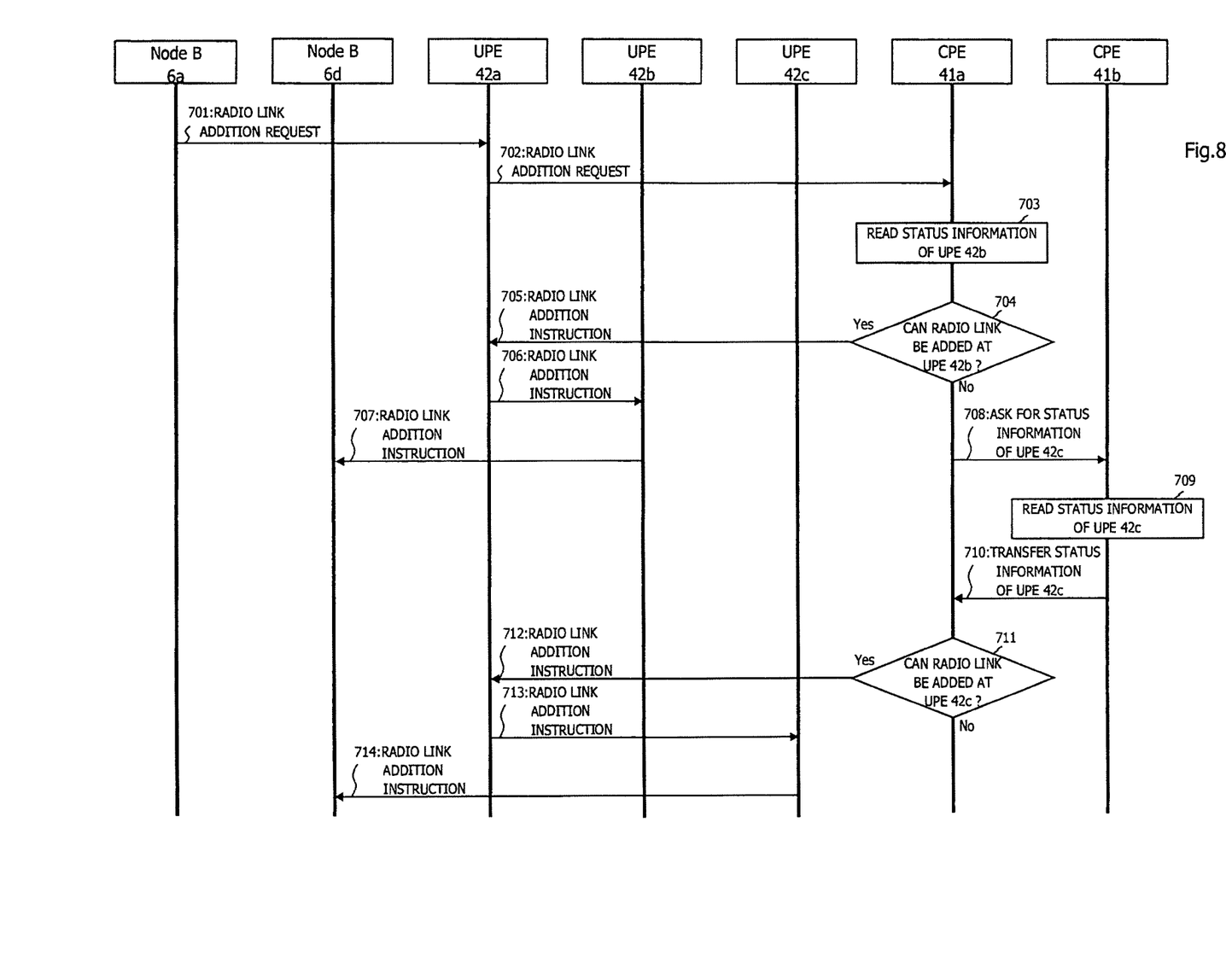
FIG. 8 is a flow chart for describing a further example of the handover operation which is performed according to the situation in FIG. 5 in the radio access network illustrated in FIG. 2.

Next described is a handoff operation when user equipment (UE) 2 moves from the cell area of Node B 6a to the cell area of Node B 6d with reference to FIG. 8. Node B 6d is subordinate to C-plane controller 41a, similar to Node B 6a, and is belongs to U-plane controller 42b subordinate to C-plane controller 41a. Further, unlike Node B 6a, Node B 6d is also subordinate to C-plane controller 41b, and belongs to U-plane controller 42c subordinate to C-plane controller 41b.

In this event, candidate radio links (RADIO LINK) for addition to Node B 6d include two routes: route #4 which passes through U-plane controller 42b, and route #5 which passes through U-plane controller 42c.

Thus, upon receipt of a request for adding a radio link to Node B 6d from Node B 6a through U-plane controller 42a (steps 701, 702), C-plane controller 41a first reads the status information table of its subordinate U-plane controller 42b, to which Node B 6d belongs, from its local memory (step 703). Then, C-plane controller 41a determines based on the status information table of U-plane controller 42b whether or not a radio link can be added at U-plane controller 42b (step 704).

When C-plane controller 41a determines at step 704 that a radio link can be added at U-plane controller 42b, C-plane controller 41a instructs U-plane controller 42b through U-plane controller 42a to add a radio link between U-plane controller 42b and Node B 6d (steps 705, 706). Subsequently, U-plane controller 42b instructs Node B 6d to add a radio link between U-plane controller 42b and Node B 6d (step 707).

On the other hand, when C-plane controller 41a determines at step 704 that no radio link can be added at U-plane controller 42b, C-plane controller 41a refers to C-plane controller 41b, to which U-plane controller 42c belongs, for the status information table of U-plane controller 42c in order to read the status information table of U-plane controller 42c to which Node B 6d additionally belongs (step 708).

In response, C-plane controller 41b reads the status information table of U-plane controller 42c from its local memory (step 709), and transfers the read status information table to C-plane controller 41a (step 710).

C-plane controller 41a determines based on the status information table transferred from C-plane controller 41b at step 710 whether or not a radio link can be added at U-plane controller 42c (step 711).

When C-plane controller 41a determines at step 711 that a radio link can be added at U-plane controller 42c, C-plane controller 41a instructs U-plane controller 42c through U-plane controller 42a to add a radio link between U-plane controller 42c and Node B 6d (steps 712, 713). Subsequently, U-plane controller 42c instructs Node B 6d to add a radio link between U-plane controller 42c and Node B 6d (step 714).

Even when C-plane controller 41a determines that no radio link can be added at either U-plane controller 42b or 42c as a result of reading the status information tables of U-plane controllers 42b, 42c, C-plane controller 41a still instructs U-plane controller 42b through U-plane controller 42a to add a radio link between U-plane controller 42b and Node B 6d to leave the determination as to whether the radio link is added to U-plane controller 42b. However, C-plane controller 41a indicates a failure of the radio link addition instruction when an alarm is generated in U-plane controller 42b.

Figure 9:
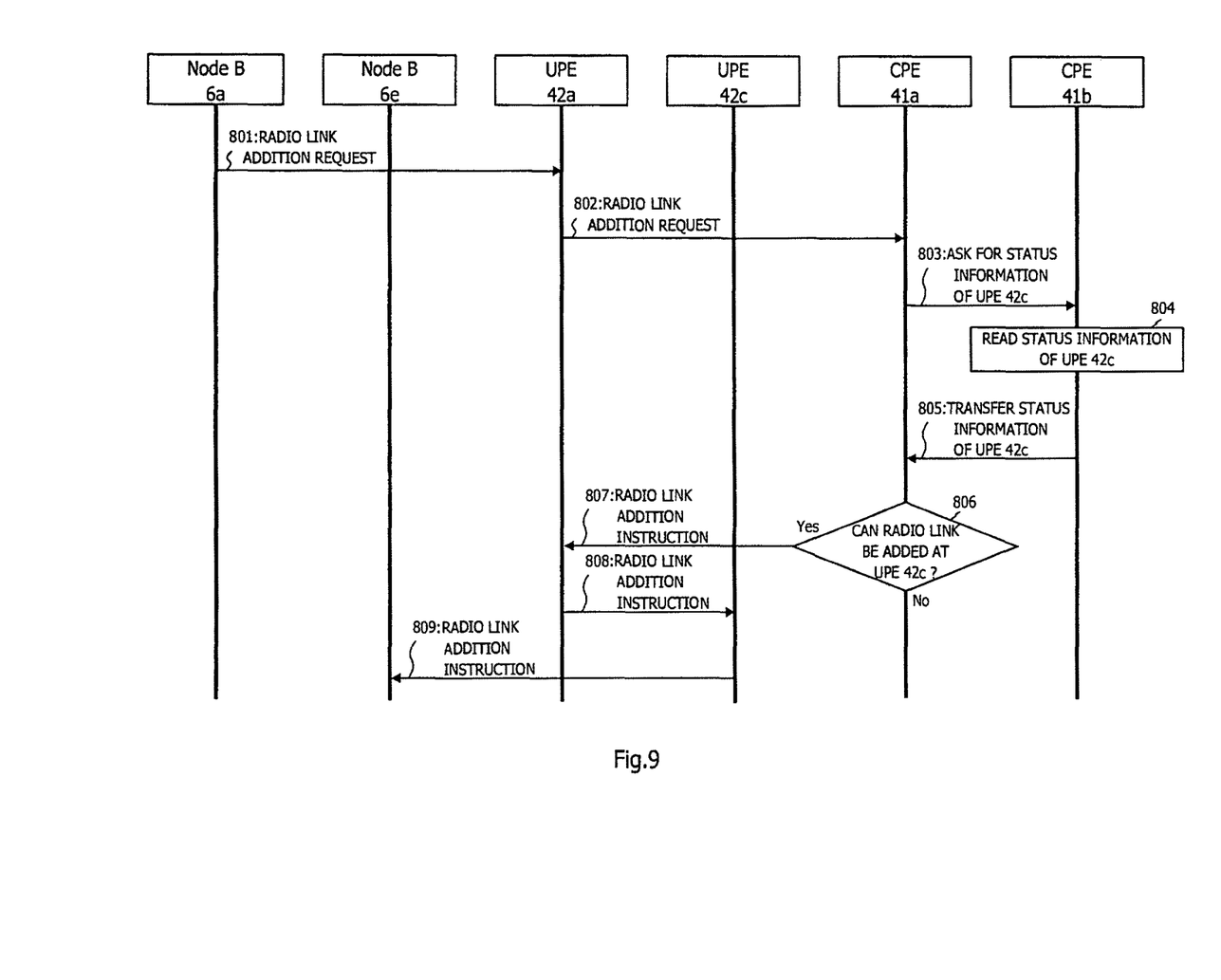
FIG. 9 is a flow chart for describing yet a further example of the handover operation which is performed according to the situation in FIG. 5 in the radio access network illustrated in FIG. 2

Next described is a handoff operation when user equipment (UE) 2 moves from the cell area of Node B 6a to the cell area of Node B 6e with reference to FIG. 9. Unlike Node B 6a, Node B 6e is subordinate to C-plane controller 41b, and belongs only to U-plane controller 42c subordinate to C-plane controller 41b.

In this event, as a candidate radio link (RADIO LINK) for addition to Node B 6e, there exists only one route, i.e., route #6 which passes through U-plane controller 42c.

Thus, upon receipt of a request for adding a radio link to Node B 6e from Node B 6a through U-plane controller 42a (steps 801, 802), C-plane controller 41a refers to C-plane controller 41b, to which U-plane controller 42c belongs, for the status information table of U-plane controller 42c in order to read the status information table of U-plane controller 42c to which Node B 6e belongs (step 803).

In response, C-plane controller 41b reads the status information table of U-plane controller 42c from its local memory (step 804), and transfers the read status information table to C-plane controller 41a (step 805).

C-plane controller 41a determines based on the status information table transferred from C-plane controller 41b at step 805 whether or not a radio link can be added at U-plane controller 42c (step 806).

When C-plane controller 41a determines at step 806 that a radio link can be added at U-plane controller 42c, C-plane controller 41a instructs U-plane controller 42c through U-plane controller 42a to add a radio link between U-plane controller 42c and Node B 6e (steps 807, 808). Subsequently, U-plane controller 42c instructs Node B 6e to add a radio link between U-plane controller 42c and Node B 6e (step 809).

Even when C-plane controller 41a determines that no radio link can be added at U-plane controller 42c as a result of reading the status information table of U-plane controller 42c, C-plane controller 41a still instructs U-plane controller 42c through U-plane controller 42a to add a radio link between U-plane controller 42c and Node B 6e to leave the determination as to whether the radio link is added to U-plane controller 42c. However, C-plane controller 41a indicates a failure of the radio link addition instruction when an alarm is generated in U-plane controller 42c.

The invention claimed is:

1. A first radio access network node in a communication system, the first radio access network node comprising a processor and a memory storing software which, when executed, enables the processor to implement:
 a controller configured to control a control plane; and
 a transceiver configured to receive, from a second radio access network node configured to control a user plane, a message that includes a data usage information of the second radio access network node.

2. The first radio access network node according to claim 1, wherein the controller is further configured to perform a connection configuration procedure based on the data usage information.

3. The first radio access network node according to claim 1, wherein the first radio access network node is not involved in control of the user plane.

4. The first radio access network node according to claim 1, wherein the message is transmitted when a state of the second radio access network node is changed.

5. The first radio access network node according to claim 1, wherein the transceiver is further configured to receive, from the second radio access network node, information related to a failed state in the second radio access network node.

6. The first radio access network node according to claim 1, wherein the transceiver is further configured to receive, from the second radio access network node, information indicating no radio resource available.

7. A second radio access network node in a communication system, the second radio access network node comprising a processor and a memory storing software which, when executed, enables the processor to implement:
 a controller configured to control a user plane; and
 a transceiver configured to transmit, to a first radio access network node configured to control a control plane, a message that includes a data usage information of the second radio access network node.

8. The second radio access network node according to claim 7, wherein a connection configuration procedure is performed by the first radio access network node based on the data usage information.

9. The second radio access network node according to claim 7, wherein the first radio access network node is not involved in control of the user plane.

10. The second radio access network node according to claim 7, wherein the message is transmitted when a state of the second radio access network node is changed.

11. The second radio access network node according to claim 7, wherein the transceiver is further configured to transmit, to the first radio access network node, information related to a failed state in the second radio access network node.

12. The second radio access network node according to claim 7, wherein the transceiver is further configured to transmit, to the first radio access network node, information indicating no radio resource available.

13. A method for a second radio access network node in a communication system, the method comprising:
 controlling a user plane; and
 transmitting, to a first radio access network node configured to control a control plane, a message that includes a data usage information of the second radio access network node.

14. The method according to claim 13, wherein a connection configuration procedure is performed by the first radio access network node based on the data usage information.

15. The method according to claim 13, wherein the first radio access network node is not involved in control of the user plane.

16. The method according to claim 13, further comprising: transmitting the message when a state of the second radio access network node is changed.

17. The method according to claim 13, further comprising: transmitting to the first radio access network node, information related to a failed state in the second radio access network node.

18. The method according to claim 13, further comprising:
 transmitting, to the first radio access network node, information indicating no radio resource available.

* * * * *